United States Patent [19]

Uetsuhara et al.

[11] Patent Number: 5,209,455
[45] Date of Patent: May 11, 1993

[54] VALVE AND SOLENOID VALVE OPERATED BY VERY SMALL FORCE

[75] Inventors: Tokio Uetsuhara, Urawa; Kenji Iio, Kurate; Masaki Kouzu, Kurate; Yuichi Andoh, Kurate, all of Japan

[73] Assignees: Mitsubishi Materials Corporation, Tokyo; MIC Co., Ltd., Fukuoka, both of Japan

[21] Appl. No.: 790,437

[22] Filed: Nov. 12, 1991

[30] Foreign Application Priority Data

Nov. 19, 1990 [JP] Japan ............... 2-311625
Mar. 7, 1991 [JP] Japan ............... 3-41632
May 29, 1991 [JP] Japan ............... 3-125959

[51] Int. Cl.⁵ .................... F16K 1/48; F16K 31/06
[52] U.S. Cl. ......................... 251/129.19; 251/129.2; 251/75; 251/86; 251/87
[58] Field of Search ............ 251/129.19, 129.2, 75, 251/86, 87

[56] References Cited

U.S. PATENT DOCUMENTS

| | | | |
|---|---|---|---|
| 2,827,923 | 3/1958 | Sadler | 251/129.19 X |
| 4,008,876 | 2/1977 | Bastle | 251/129.19 |
| 4,759,331 | 7/1988 | Sausner | 251/129.19 X |
| 4,790,346 | 12/1988 | Kolze et al. | 251/129.19 X |

FOREIGN PATENT DOCUMENTS 742732 12/1943 Fed. Rep. of Germany ... 251/129.2

Primary Examiner—Arnold Rosenthal
Attorney, Agent, or Firm—Bierman & Muserlian

[57] ABSTRACT

There are provided a valve which is opened by an improved two-step motion, a valve which operates positively without leakage of fluid even when the difference in pressure between inlet and outlet of the valve is very small, and an improvement of a solenoid valve using those valves.

The present invention relates to small-sized opening/closing valve and solenoid valve capable of being operated by very small force and electric power using a dry cell or the like, and is suitable to a solenoid valve for automatic opening/closing control which is used in city gas appliances, etc.

4 Claims, 6 Drawing Sheets

VALVE AND SOLENOID VALVE OPERATED BY VERY SMALL FORCE

FIELD OF ART

The present invention relates to a valve and a solenoid valve for opening and closing the flow of fluid in a fluid pipe. Particularly, the present invention is concerned with small-sized opening/closing valve and solenoid valve capable of being operated by very small force and electric power, using a dry cell or the like.

The present invention concerns an improved technique relating to a valve constructed so that a partial opening is made between a valve body and a valve seat in a closed state of the valve to eliminate a back pressure of fluid acting on the valve body and thereafter the valve is fully opened, a valve capable of operating positively without the leakage of fluid even when the back pressure is very low, and a solenoid valve using those valves. The present invention can contribute to the reduction in size of a valve driving electromagnet, power saving and the stabilization of operation.

BACKGROUND ART

Heretofore, as an automatic open/close controlling valve for gas appliances such as city gas appliances, there has been used a small-sized solenoid valve which is operated using a dry cell or the like. Calculation will now be made about the force required for opening and closing a 28 mm dia. in a city gas pipe for example used at an end user. For example, in a solenoid valve wherein fluid of gas pressure of 500 mm in terms of water column is opened and with a 28 mm dia. valve, a back pressure of about 300 g is exerted on the back of the valve in a closed state. An electromagnet for opening and closing such a valve requires a valve holding spring force of 250 g, so it has heretofore been necessary to use a large-sized electromagnet having an initial pull-up force of 550 g and a stroke of 6 mm or so.

Thus, in the prior art, a large-sized electromagnet is required because of a great influence of the valve back pressure, so it is impossible to adopt a power source of a very small capacity such as a dry cell for example and the use of a commercial power source is unavoidable, thus resulting in increase of the equipment cost.

There has been proposed a technique of attaching a small pilot valve for pressure equalizing to a valve, opening pilot valve prior to opening of the valve to eliminate the difference between upstream pressure and downstream pressure, thereby decreasing the force required for valve opening and closing to reduce the differential force of the valve. According to such technique, there have been known a construction wherein a pilot valve is disposed in a by-pass, and a construction wherein a valve element itself is formed with a pilot valve to provide a two-stage motion structure for a valve stem of a valve body between pilot valve open and valve body open.

Such conventional technique of providing a by-pass and mounting a separate pilot valve therein and technique of incorporating a separate pilot valve in a valve body are disadvantageous in that both are complicated in structure and expensive.

There also is a problem such that the lower limit value of electric power consumed for positively a solenoid valve using such valve varies greatly in each operation. For ensuring opening/closing operation even at a maximum variation, it is necessary to use a battery of a high voltage for example and set the power consumption rather high in each operation, counting a considerable safety factor. A further reduction of the power consumption has been desired. In an ordinary valve for gas, it is required that there be no leakage of fluid when the urging force of a spring for pressing a valve body against a valve seat is 80 g and the back pressure is 1,000 mm to 20 mmH$_2$O. In such a conventional valve as illustrated in FIG. 9, however, the back pressure is not always constant. In a solenoid valve for opening and closing a valve of D=28 mm, when the back pressure is 20 mmH$_2$O for example, it is almost the urging force of the spring alone that serves as a valve closing force, so there has been a likelihood of increased leakage of fluid between a valve seat 2 and a valve body 1. In this conventional example, leakage occurs at a back pressure below 150 mmH$_2$O. The numeral 3 denotes a valve stem and numeral 6 denotes a presser member for the valve body 1.

It is the object of the present invention to solve the above-mentioned problems of the prior art and provide an improved valve capable of being operated and closed with a very small force or a very small power source such as a battery without the need of using such a separate valve as has been referred to above, and also provide an improved technique relating to a solenoid valve using such improved valve.

DISCLOSURE OR THE INVENTION

The present invention adopts the following technical means for overcoming the above-mentioned problems.

(1) Valve

① A valve operated by a very small force, comprising a valve seat, a valve body mounted on a valve stem and capable of moving into contact with and away from the valve seat, thereby assuming an open or closed state to control the flow of fluid, and an attraction releasing member for pushing up or pulling up a part of the valve body near the valve seat in accordance with the movement of the valve stem at the beginning of the valve opening motion to partially release the attracted state between the valve body and the valve seat.

② There may be used a valve body having flexibility in the valve opening/closing directions, and the attraction releasing member may be constituted by a push-up member for pushing up a part of the valve body positioned near the valve seat.

③ As another embodiment, the valve stem may be mounted to the valve body through clearance in a lifting direction of the valve stem, and the attraction releasing member be constituted by a pull-up member for pulling up a part of the valve body positioned near the valve seat at the time of start-up of the valve opening motion of the valve stem.

④ In this case, the valve may be constituted by a valve member having rigidity or flexibility. Also, the valve may be constructed in such a manner that the valve stem axis is in an offset position relative to the valve body axis.

⑤ It is preferable that the valve comprise a valve seat and a valve body mounted to a valve stem and capable of moving into contact with and away from the valve seat, thereby assuming an open or closed state to control the flow of fluid, and that if the inside diameter of the valve seat is D mm and the diameter of a pressing portion for pressing the valve body directly is d mm, the following relationship be satisfied:

$$D \times 20\% > D-d > 1 \text{ mm}$$

(2) Solenoid Valve

The present invention is also applied to a solenoid valve comprising a yoke; a fixed iron core fixed to the yoke; a movable iron core capable of moving into contact with and away from the fixed iron core; an electric winding wound round a magnetic path comprising the yoke, fixed iron core and movable iron core and which when electrified moves the movable iron core; a first spring interposed between the movable iron core and the fixed iron core and using the movable iron core away from the fixed iron core; a valve stem disposed in a valve stem disposing hole of the movable iron core; a valve seat; a valve body mounted to the valve stem and capable of moving into contact with and away from the valve seat, thereby assuming an open or closed state to control the flow of fluid; and a second spring interposed between the valve stem and the movable iron core so that the movable iron core is attracted to the fixed iron core against the urging force of the first spring while the valve body maintains its attracted state to the valve seat by the pressure of fluid in the initial electrified stage of the electric winding. The valve construction is as follows.

(a) The solenoid valve is provided with an attraction releasing member for partially releasing the attracted state of the valve body to the valve seat by pushing up or pulling up a part of the valve body positioned near the valve seat through the motion of the valve stem in the initial stage mentioned above, the valve stem being disposed through a clearance with respect to a circumferential wall of the aforementioned valve stem disposing hole except a circumferential linear contact portion thereof with the circumferential wall.

(b) Construction may be made so as to satisfy the following relationship wherein the inside diameter of the valve seat is D mm and the diameter of a pressing portion for pressing the valve body directly is d mm:

$$D \times 20\% > D-d > 1 \text{ mm}$$

(c) In the connection with the above (b), the solenoid valve may be provided with an attraction releasing member which partially releases the attracted state between the valve body and the valve seat by pushing up or pulling up a part of the valve body positioned near the valve seat through the motion of the valve stem at the beginning of the valve opening motion.

(d) In the above (c), construction may be made so that the valve stem is disposed through a clearance with respect to the circumferential wall of the foregoing valve stem disposing hole except a circumferential linear contact portion thereof with the circumferential wall.

BRIEF DESCRIPTION OF THE DRAWINGS

FIG. 1 is an explanatory sectional view explaining the operation of a valve according to a first embodiment of the present invention, in which

FIG. 2 is an explanatory sectional view explaining the operation of a valve according to a second embodiment of the present invention, in which

FIG. 3 is an explanatory view of a plate member shown in FIG. 2, in which

BEST FORM FOR PRACTICING THE INVENTION

Figure 1A:
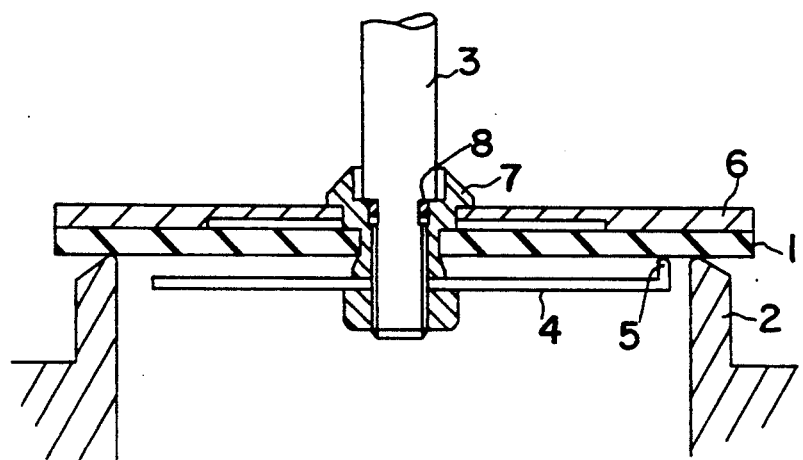
FIG. 1(a) illustrates a closed state of the valve and FIG. 1(b) illustrates a state just after the start of movement of a valve stem in a valve opening direction.

The valve and solenoid valve of the present invention will be described in detail hereinunder.

(1) Valve

First Embodiment

A first embodiment of the present invention will be described below with reference to the explanatory views of FIGS. 1(a) and 1(b).

The valve of this embodiment comprises a valve seat 2; a valve body 1 mounted on a valve stem 3 and capable of moving into contact with and away from the valve seat 2, thereby assuming an open state or a closed state to control the flow of fluid, a valve body 1 having flexibility in the valve opening/closing directions; and an attraction releasing member which partially releases an attracted state between the valve body 1 and the valve seat 2 by pushing up a part of the valve body 1 positioned near the valve seat at the beginning of a valve opening motion of the valve stem 3. The valve stem 3 is located such that its central axis is positioned within the inner diameter of the valve seat 2. When the valve is closed, the valve body 1 is pushed against the valve seat 2 so that the valve seat 2 is pushed with an equal force over the entire rim portion of the valve seat 2. In this embodiment, as the attraction releasing member, the valve stem 3 is provided with a push-up member 4 having a convex portion 5 for pushing up a part of the valve body 1 positioned near the valve seat 2 upon abutment with the valve body. In this embodiment, moreover, a metallic piece 7 is fixed to the valve stem 3 through a seal 8, and the valve body 1 and the push-up member 4 are attached to the metallic piece 7. Further, a valve body presser member 6 is mounted on the valve body 1.

In the explanatory view of FIG. 1(a), the valve seat 2 and the valve body 1 are in a closed state. The valve body 1 is mounted to the valve stem 3, and as shown in FIG. 1(b), it has flexibility in operating directions of the valve stem 3, that is, in the opening/closing directions of the valve body 1.

Figure 1B:
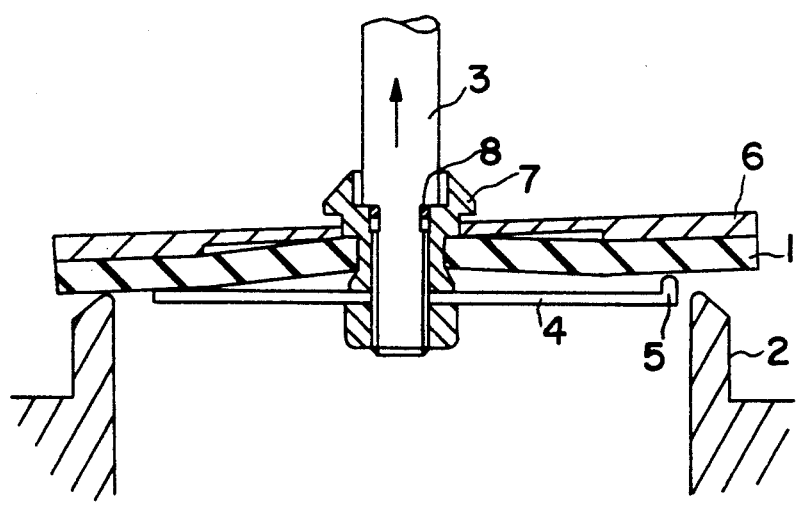

FIG. 1(b) is an explanatory view showing the state of various portions just after the start of movement of the valve stem 3 in the valve opening direction. The pulling-up force of the valve stem 3 is concentrated on the convex portion 5 positioned near the valve seat 2 to partially release the attracted state between the valve body 1 and the valve seat 2. Upon such partial release of the attracted state, fluid flows through this portion to equalize the pressure between the upstream side and the downstream side of the valve, so that there is no longer any back pressure based on pressure difference and then the valve stem 3 can open the valve easily with a very small force. According to an experiment, it turned out that the foregoing fluid back pressure of about 300 g could be decreased to half.

Second Embodiment

A second embodiment of the present invention will be described below with reference to FIGS. 2(a) and 2(b). FIGS. 3(a) and 3(b) are explanatory views of a plate member.

In the valve of this embodiment, a valve stem 3 is mounted to a flexible valve body 1 through a clearance in a lifting direction of the valve stem, and it is constructed so as to pull up a part of the valve body 1 positioned near a valve seat 2 at the beginning of a valve opening motion started by pulling up the valve stem. More specifically, a plate member 22 is mounted to the valve stem 3 and is accommodated in a floating state within a cavity of the valve body, and a pull-up member 23, which is a projection, is formed in an offset position on the plate member 22. As shown in FIG. 3, the plate member 22 is fixed to the lower end of the valve stem 3 with a bolt 21 and is provided with the projection 23 formed on a part thereof. This projection or the pull-up member 23 pulls up a part of an upper flange 24 of the valve body 1 at the beginning of the valve opening motion of the valve stem 3.

Figure 2A:
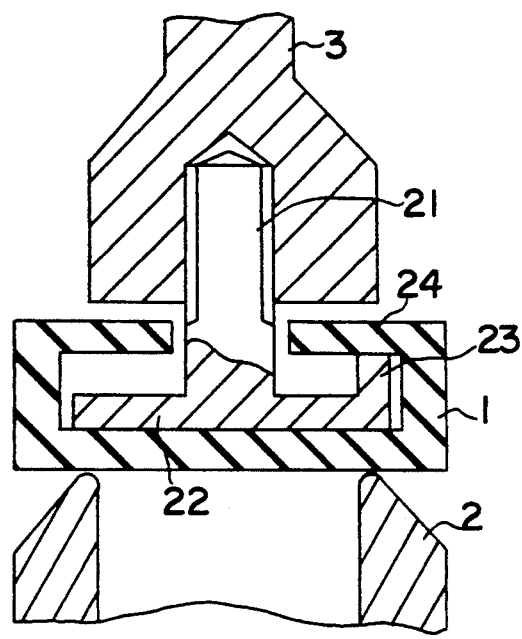
FIG. 2(a) illustrates a closed state of the valve and FIG. 2(b) illustrates a state just after the start of movement of a valve stem in a valve opening direction.
Figure 3A:
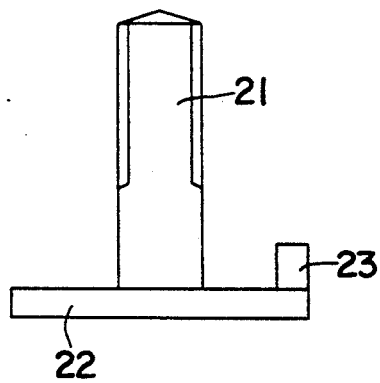
FIG. 3(a) is a side view and FIG. 3(b) is a plan view.
Figure 3B:
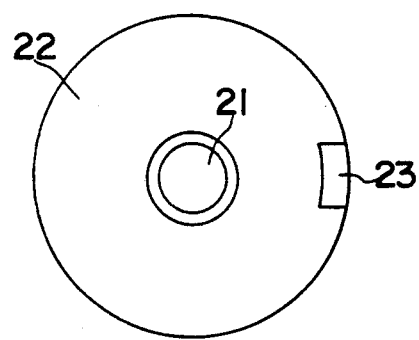

In the explanatory view of FIG. 2(a), the valve seat 2 and the valve body 1 are in a closed state.

Figure 2B:
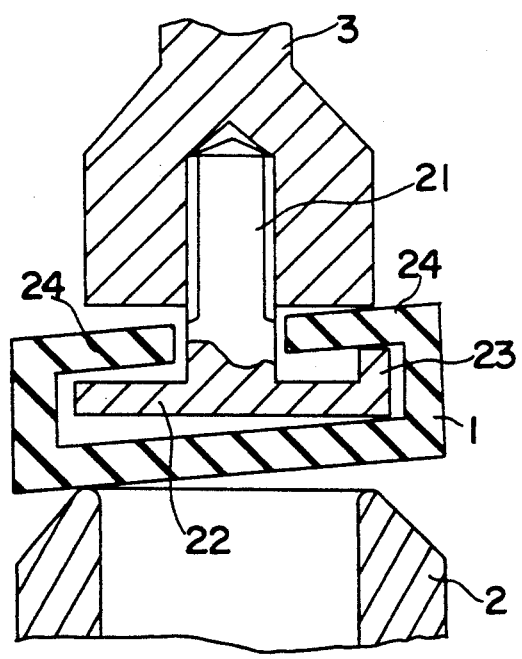

FIG. 2(b) is an explanatory view showing the state just after the start of movement of the valve stem 3 in the valve opening direction. The pulling-up force of the valve stem 3 is concentrated on the projection (pull-up member) 23 to open a part of the seal between the valve body 1 and the valve seat 2, so that the foregoing back pressure of about 300 g acting on the valve can be decreased to half. The projection 23 may be provided on the valve body 1 side, not the plate member 22 side.

Third Embodiment

A third embodiment will now be described with reference to FIG. 4 in which the axis of a valve stem 3 is eccentric with respect to the axis of a valve body 1. The valve body 1 is put on a valve seat 2, and the eccentric valve stem 3 is engaged with the valve body 1 through a clearance in a lifting direction of the valve stem. Although the central line of the valve stem 3 is displaced with respect to the central point of the valve seat 2, the central line of the valve stem 3 is placed within the inner diameter of the valve seat 2. A flat plate-like presser plate 32 is mounted to the lower end of the valve stem 3, and a push-up member 33 is formed on the upper surface of the presser plate 32. When the valve stem 3 is pulled up, the pull-up member 33 comes into abutment with a part of the upper flange 34 of the valve body and pulls up the valve body in the eccentric position.

First, the valve body is tilted and pulled up with a very small force to equalize the fluid pressure between the upper and lower surfaces of the valve body, then the whole of the valve body is pulled up. Thus, the opening of the valve can be attained with a very weak force.

Although in the above second and third embodiments a flexible valve body was used as the valve body 1, a rigid valve body may be used. By pulling up the rigid valve body 1 in the eccentric portion, the valve body can be tilted with a very weak force and so it is possible to greatly reduce the valve opening force. In the case of the flexible valve body 1, the valve body 1 is made flexible to the extent that it is slightly deformed when pulled up partially and the seal between the valve body and the valve seat is opened partially. For example, if the valve body is formed using a hard rubber, there can be attained the above flexibility easily. The shape of the valve body is designed so that the lower surface of the valve body serves as a close contact surface with the valve seat and the valve body is connected to the valve stem through a clearance in the lifting direction of the valve stem. The flexible body may be formed by integral molding. In this case, the valve body is deformed at a time of assembly of the valve stem and the plate member is pushed into the cavity of the valve body. Also, a plurality of members may be assembled into an integral body by bonding or using a physical mounting means or the like.

Fourth Embodiment

A valve according to this embodiment will now be described with reference to FIG. 5.

Figure 9:
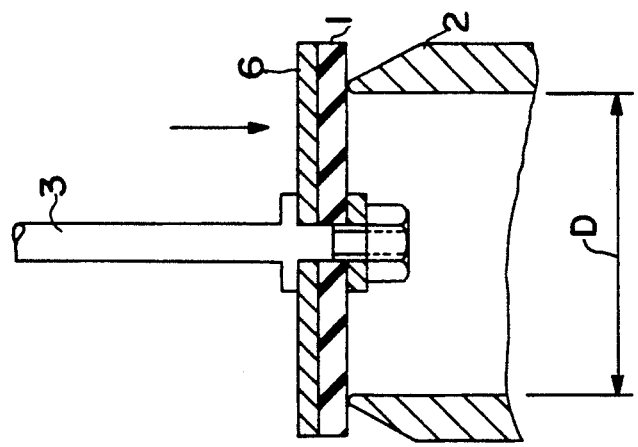
FIG. 9 is an explanatory view of a conventional valve.

FIGS., 5(a) and (b) illustrate the valve in its opened state and its closed state, respectively. In this embodiment, a ring 40 having a diameter of d mm, which is an example of the pressing portion referred to herein, is inserted between the valve body 1 and the presser member 6 in the conventional valve illustrated in FIG. 9. The valve of this embodiment is constructed so as to satisfy the following relationship wherein the inside diameter of the valve seat 2 is D mm:

$$D \times 20\% > D - d > 1 \text{ mm}$$

In this construction, when the valve stem 3 is pressed by a spring, the valve body 1 deflects downwards at the contact portion thereof with the valve seat 2, thus permitting a satisfactory sealing effect to be exhibited with a small urging force. If the D-d value is too large, the deflection will become large, and if it is too small, there will be no deflection. Under both conditions, a leakage of fluid may easily occur. It is desirable that the D-d value be within the above range.

In this embodiment, the leakage of fluid did not occur even at a back pressure of 20 mmH$_2$O under the conditions of D=28 mm, D-d=1 to 5 mm and ring thickness=0.2 mm. As the valve body 1 there was used a rubber having a hardness of 50° to 80°.

Although the ring 40 is used as an example of the pressing portion in this embodiment, this constitutes no limitation. For example, the ring 40 and the presser member 6 may be formed integrally.

(2) Solenoid Valve

Solenoid valves according to embodiments of the present invention will be described below.

Figure 5A:
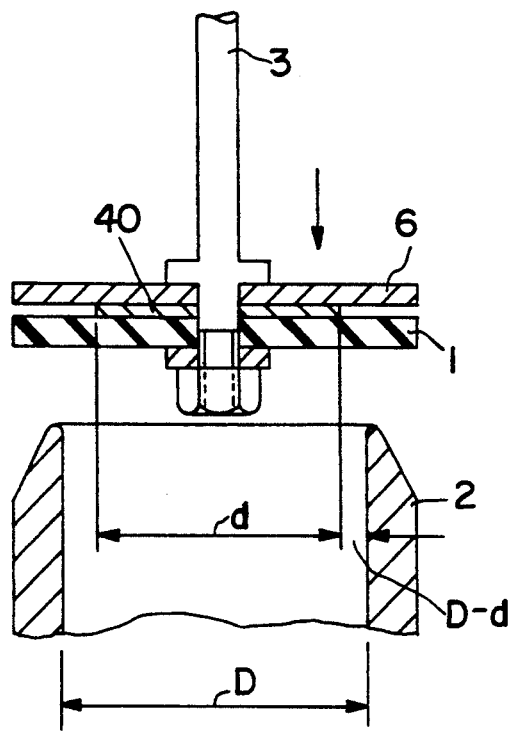
FIG. 5(a) and (b) is an explanatory sectional view of a valve according to a fourth embodiment of the present invention.
Figure 5B:
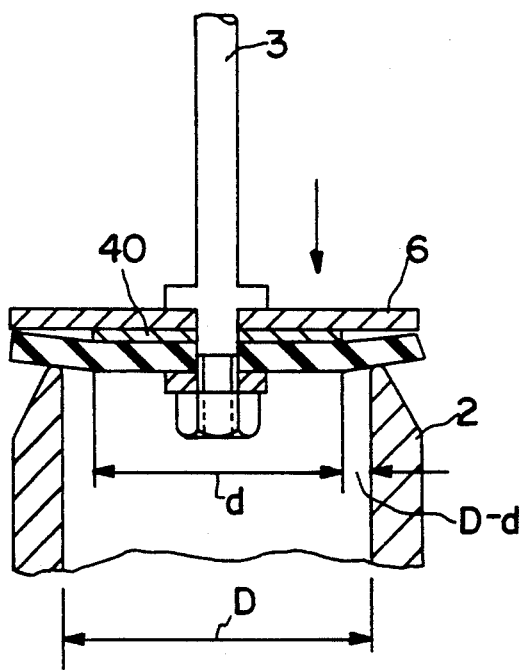
Figure 6:
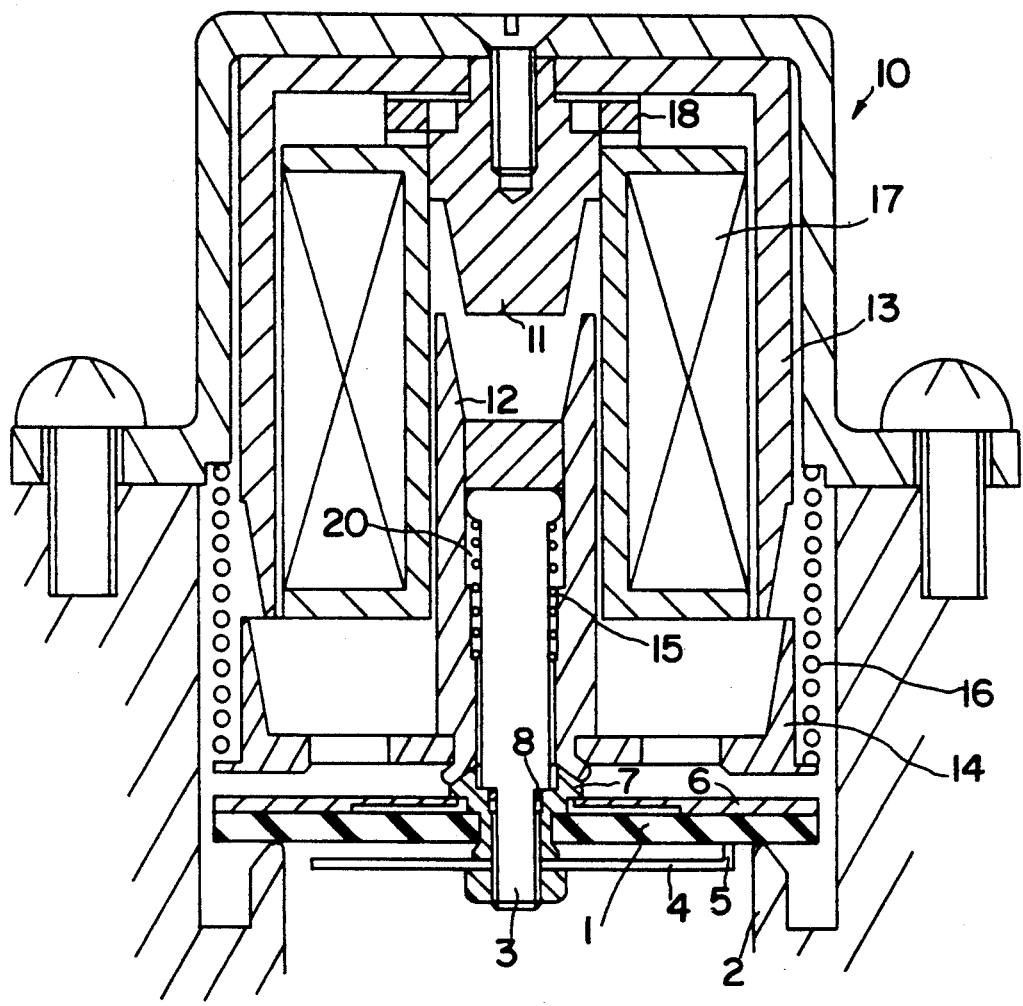
FIG. 6 is a vertical sectional view of a solenoid valve embodying the present invention, using the valve shown in FIG. 1.

FIG. 6 is a vertical sectional view of a solenoid valve embodying the present invention. This solenoid valve, indicated at 10, includes a yoke 13, a fixed iron core 11 fixed to the yoke 13, and a movable iron core 12 capable of moving into contact with and away from the fixed iron core 11. The movable iron core 12 is urged downwards in FIG. 5 by means of a first spring 16. Further, a permanent magnet 18 is disposed near the fixed iron core 11, and an electric winding 17 is disposed in a magnetic path constituted by the yoke 13, fixed iron core 11 and movable iron core 12. When the electric winding 17 is electrified, the movable iron core 12 is attracted to the fixed iron core 11, coupled with the effect of a magnetic flux of the permanent magnet 18, and moves upward in FIG. 6. A valve stem 3 is disposed within a valve stem disposing hole 20 of the movable iron core 12. The shape and the state of arrangement of the valve stem 3 will be described later. To a lower portion of the valve stem 3 projecting from the valve stem disposing hole 20 is mounted the valve of the present invention shown in FIG. 1.

When the electric winding 17 is not electrified and the movable iron core 12 occupies its lower position in FIG. 5 under the biasing force of the first spring 16, the valve body 1 is attracted to the valve seat 2, whereby the fluid flow path is held in a valve closed state, while when the electric winding 17 is electrified, the movable iron core 12 is attracted to the fixed iron core 11, the valve body 11 moves away from the valve seat 2, and the fluid flow path assumes a valve-open state.

Figure 7:
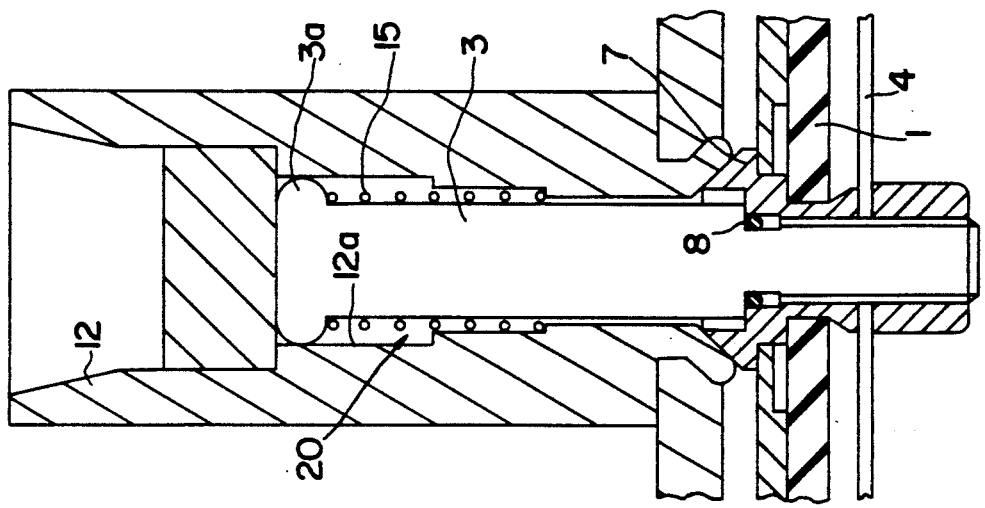
FIG. 7 is a vertical sectional view showing a valve stem and the vicinity thereof illustrated in FIG. 6.

This embodiment resides in an improvement of a solenoid valve using any of the valves illustrated in FIGS. 1, 2, 4, 5 and operated by a very small force, and a characteristic feature thereof resides in a mounting structure for the movable iron core and the valve stem. The construction of this embodiment will be described below in detail with reference to FIGS. 6 and 7. FIG. 7 is a vertical sectional view showing on a larger scale the valve stem and the vicinity thereof illustrated in FIG. 6. to clearly indicate a state in which the valve stem 3 is contacted in linear form with the valve stem disposing hole 20.

The valve stem 3 is disposed within the valve stem disposing hole 20 except a part of its lower portion. In the circumferential direction (transverse direction in FIG. 7) of the valve stem 3 there is formed a gap between the valve stem and an inner wall 12a of the movable iron core 12 which defines the valve stem disposing hole 20, provided the valve stem 3 is formed with a linear contact portion 3a for restricting the position of the valve stem in the hole 20. The linear contact portion 3a is in linear contact with the inner wall 12a of the movable iron core 12 in the circumferential direction thereof.

In this embodiment, the metallic piece 7 is in contact with the lower portion of the movable iron core 12 through inclined surfaces to cause the central axis of the valve stem 3 to coincide with the central axis of the valve stem disposing hole 20 together with said contact part 3a when the valve is closed, resulting in a friction between the valve stem 3 and the inner wall of the valve stem disposing hole 20 which is restricted to a minimum friction. In such construction of this embodiment, at the time of a valve opening operation which will be described later, only the linear contact portion 3a of the valve stem 3 slides with respect to the movable iron core 12 and hence the frictional resistance between the valve stem and the movable iron core is kept to a minimum, whereby the reduction of power consumption can be attained and variations in power consumption can be suppressed.

The operation of this embodiment will now be described. In the valve closed state (before the supply of electric power to the electric winding 17) as shown in FIGS. 1(a) and 6, upon start of electrifying of the winding 17, the movable iron plate 12 is slightly attracted to the fixed iron core 11 against the urging force of the first spring 16 which is not so strong yet, whereby the valve stem 3 is slightly lifted upward through a second spring 15. This state is as illustrated in FIG. 1(b). The pulling-up force of the valve stem 3 is concentrated on the convex portion 5 positioned closed to the valve seat 2, whereby the attracted stat between the valve body 1 and the valve seat 2 is partially released. Consequently, as has been explained in connection with FIG. 1, fluid flows through this portion and the fluid back pressure acting on the valve is reduced, so that the movable iron core 12 and the valve stem 3 are attracted to the fixed iron core 11 against the biasing force of the first spring 16 and the valve assumes an open state. Thus, by performing the valve opening operation in a two-step portion, there can be constituted a solenoid valve capable of performing a valve opening/closing operation using a very small electric power.

Further, since the valve stem 3 slides only at its linear contact portion 3a with respect to the inner wall 12a of the movable iron core 12, the electric power consumed for the valve opening/closing operation is further decreased and at the same time it is possible to suppress variations in such power consumption. According to an experiment conducted by the present inventors, in the case of a valve stem not specially taking into the account the decrease of the sliding resistance with respect to the movable iron core 12, under the conditions of a gas fluid pressure 1,000 mmH$_2$O and a coil resistance 5 $\Omega$ of the electric winding 17, a minimum voltage to be applied to the winding 17 necessary for performing the valve opening operation is 2.0 V to 2.4 V and it varies in this range at every valve opening operation, but by minimizing the sliding resistance of the valve stem 3 as described above, the valve was operated stably at a lower voltage of 1.6 V±0.1 V and with few variations. As a result, by incorporating a lithium battery for example in the solenoid valve 10, it is made possible to operate the valve several ten thousand times in terms of the number of opening/closing motions and about ten years in terms of the operation period.

Figure 8:
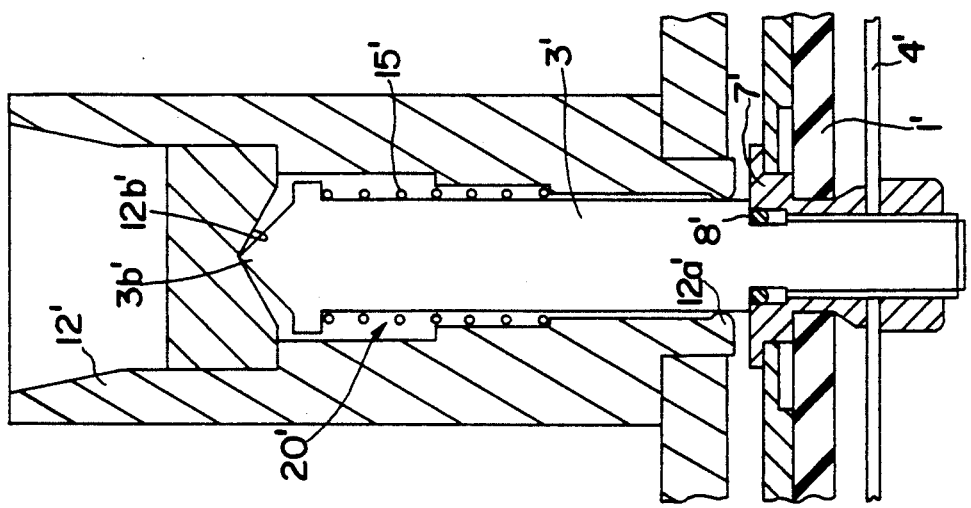
FIG. 8 is a vertical sectional view showing a valve stem and the vicinity thereof on a larger scale in a solenoid valve further embodying the present invention.

Referring now to FIG. 8, there is illustrated an embodiment different from that shown in FIG. 7. As to reference numerals, dashes are affixed to the same numerals as in FIG. 7, and explanation will be omitted except portions peculiar to this embodiment.

In this embodiment, the lower portion of movable iron core 12' has a valve stem supporting portion 12a' which comes into linear contact with a valve stem 3' along the circumference of the valve stem The upper portion of the valve stem ' is formed in a conical shape, and a vertex 3b' of the cone is in abutment with a conical concave 12b' formed in the movable iron core 12'. The position of the valve stem 3' in the valve stem disposing hole 20 is determined by the linear contact thereof with the valve stem supporting portion 12a' and also by the fitting of the vertex 3b' and the concave 12b', whereby the reduction of the sliding resistance in the valve opening motion is attained.

As to the valve stem supporting means used in the present invention, no limitation is made to the above two embodiments of solenoid valves. Various other constructions may be adopted if only the valve stem slides in linear contact with the movable iron core in the circumferential direction of the valve stem.

Figure 4:
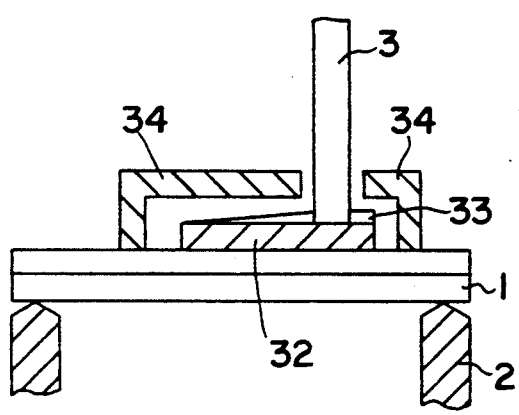
FIG. 4 is an explanatory sectional view of a valve according to a third embodiment of the present invention.

Although the solenoid valves of the above embodiments employ the valve illustrated in FIG. 1, there may be used any of the valves illustrated in FIGS. 2, 4 and 5.

In the case of a solenoid valve using the valve shown in FIG. 5, it may be constructed so that the valve is opened in a two-step motion, using the push-up member 4 shown in FIG. 1.

We claim:

1. A solenoid valve operated by a very small force, comprising: a yoke; a fixed iron core fixed to said yoke; a movable iron core capable of moving into contact with and away from said fixed iron core, said movable iron core having a valve stem disposing hole; an electric winding wound round a magnetic path constituted by said yoke and said movable and fixed iron cores, said electric winding when electrified functioning to move the movable iron core; a first spring interposed between said movable and fixed iron cores and urging the movable iron core away from the fixed iron core; a valve seat having a circular opening with an inside diameter encircled by a circular rim portion; a valve body capable of moving into contact with and away from said valve seat, thereby assuming an open state or a closed state to control the flow of fluid; a valve stem disposed within the valve stem disposing hole of said movable iron core whose central axis is positioned within the inside diameter of said valve seat, moved along said central axis together with said valve body and for pushing said valve body against said valve seat so that said valve seat is pushed with an equal force over the entire rim portion of said valve seat when the valve is closed; and a second spring interposed between said valve stem and said movable iron core so that in initial electrified stage of said electric winding, said movable iron core is attracted to said fixed iron core against the urging force of said first spring while said valve body is kept attracted to said valve seat by the pressure of the fluid, wherein there is provided an attraction releasing member fixed to said valve stem which attraction releasing member moves up a part of said valve body positioned near the rim portion of said valve seat in accordance with movement of said valve stem in said initial electrified stage to partially release said attracted state, and said valve stem is disposed through a clearance with respect to a circumferential wall of said valve stem disposing hole except circumferential linear contact portion thereof with said circumferential wall.

2. A solenoid valve operated by a very small force, comprising: a yoke; a fixed iron core fixed to said yoke; a movable iron core capable of moving into contact with and away from said fixed iron core, said movable iron core having a valve stem disposing hole; an electric winding wound round a magnetic path constituted by said yoke and said fixed and movable iron cores, said electric winding when electrified functioning to move the movable iron core; a first spring interposed between said movable and fixed iron cores and urging the movable iron core away from the fixed iron core; a valve seat having a circular opening with an inside diameter of D mm encircled by a circular rim portion; a valve body capable of moving into contact with and away from said valve seat, thereby assuming an open state or a closed state to control the flow of fluid; a valve stem disposed within the valve stem disposing hole of said movable iron core, whose central axis is positioned within the inside diameter of said valve seat, moved along said central axis together with said valve body and for pushing said valve body against said valve seat so that said valve seat is pushed with an equal force over the entire rim portion of said valve seat when the valve is closed; and a pressing portion disposed at a back side of said valve seat with said valve body between, contacted to said valve body in a disk-like manner of a diameter of d mm, fixed to said valve stem so that a central point of said disk is placed on the central axis of said valve seat and fulfilling a relation of $D \times 20\% > D - d > 1$ mm and a second spring interposed between said valve stem and said movable iron core so that in an initial electrified stage of said electric winding, said movable iron core is attracted to said fixed iron core against the urging force of said first spring while said valve body is kept attracted to said valve seat by the pressure of fluid 3. A solenoid valve operated by a very small force according to claim 2, further including an attraction releasing member fixed to said valve stem which moves up a part of said valve body positioned near the rim portion of said valve seat in accordance with movement of said valve stem at the beginning of a valve opening motion.

4. A solenoid valve operated by a very small force according to claim 3, wherein said valve stem is disposed through a clearance with respect to a circumferential wall of said valve stem disposing hole except a circumferential linear contact portion thereof with said circumferential wall.

* * * * *